United States Patent
Hill et al.

(10) Patent No.: US 9,578,271 B2
(45) Date of Patent: Feb. 21, 2017

(54) INTEGRATED USER INTERFACE FOR INTERNET-ENABLED TV

(75) Inventors: Seth Hill, La Mesa, CA (US); Tracy Ho Barnes, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1588 days.

(21) Appl. No.: 12/688,595

(22) Filed: Jan. 15, 2010

(65) Prior Publication Data
US 2011/0047572 A1    Feb. 24, 2011

Related U.S. Application Data

(60) Provisional application No. 61/234,913, filed on Aug. 18, 2009.

(51) Int. Cl.
| | |
|---|---|
| *G06F 3/00* | (2006.01) |
| *G06F 13/00* | (2006.01) |
| *H04N 5/445* | (2011.01) |
| *H04N 21/431* | (2011.01) |
| *H04N 21/462* | (2011.01) |

(52) U.S. Cl.
CPC ...... *H04N 5/44543* (2013.01); *H04N 5/44513* (2013.01); *H04N 5/44582* (2013.01); *H04N 5/44591* (2013.01); *H04N 21/4314* (2013.01); *H04N 21/4622* (2013.01)

(58) Field of Classification Search
CPC ............ H04N 21/4314; H04N 21/4622; H04N 5/44543; H04N 5/44582; H04N 5/44591
USPC ............ 725/37–61; 348/564, 584, 705, 706; 715/716–722, 781, 841, 838
See application file for complete search history.

(56) References Cited

U.S. PATENT DOCUMENTS

| | | | |
|---|---|---|---|
| 5,179,653 A * | 1/1993 | Fuller ........................... | 715/840 |
| 5,485,197 A | 1/1996 | Hoarty | |
| 6,028,600 A | 2/2000 | Rosin et al. | |
| 6,236,395 B1 * | 5/2001 | Sezan et al. .................. | 715/723 |
| 7,174,512 B2 * | 2/2007 | Martin et al. .................. | 715/719 |
| 2003/0234804 A1 * | 12/2003 | Parker et al. .................. | 345/719 |
| 2005/0097595 A1 * | 5/2005 | Lipsanen et al. ............... | 725/25 |
| 2005/0204389 A1 | 9/2005 | Proehl et al. | |
| 2006/0005207 A1 * | 1/2006 | Louch et al. .................. | 719/328 |
| 2006/0015818 A1 * | 1/2006 | Chaudhri et al. .............. | 715/779 |
| 2006/0150215 A1 * | 7/2006 | Wroblewski ..................... | 725/47 |
| 2007/0204238 A1 | 8/2007 | Hua et al. | |
| 2008/0163059 A1 * | 7/2008 | Craner .......................... | 715/719 |
| 2009/0282358 A1 | 11/2009 | Park et al. | |

FOREIGN PATENT DOCUMENTS

KR    100870599    11/2008

OTHER PUBLICATIONS

Divitel, "Over The Top":, http://www.divitel.com/Services/Downloads/fokusOnOTT.pdf.

(Continued)

*Primary Examiner* — Hunter B Lonsberry
*Assistant Examiner* — Patrick A Ryan
(74) *Attorney, Agent, or Firm* — John L. Rogitz

(57) ABSTRACT

A user interface (UI) for an Internet enabled TV lists content genre such as photos, music, and video, and for each genre a sub-list of content is provided regardless of the source of the content, i.e., regardless of whether the content in the particular genre is stored locally or is sourced from the Internet.

9 Claims, 8 Drawing Sheets

(56) References Cited

OTHER PUBLICATIONS

Widgets Lab, "Samsung MediaLive with stream digital content from your PC to your HDTV, will bring in some Widgets too" http://www.widgetslab.com/2008/07/25/samsung-medialive-will-stream-digital-content-from-your-pc-to-your-hdtv-will-bring-in-some-widgets-too/.
Sun, "TS-5722-Interactive Application Development for IPTV", http://developers.sun.com/learning/javaoneonline/2008/pdf/TS-5722.pdf?cid=925559.
Prolg, "Peertv to Lauch Version 3.0 of Mediaxplorer at Iptv World Forum", http://www.prolg.org/10191118-peertv-to-launch-version-30-of-mediaxplorer-at-iptv-world-forum.html.

* cited by examiner

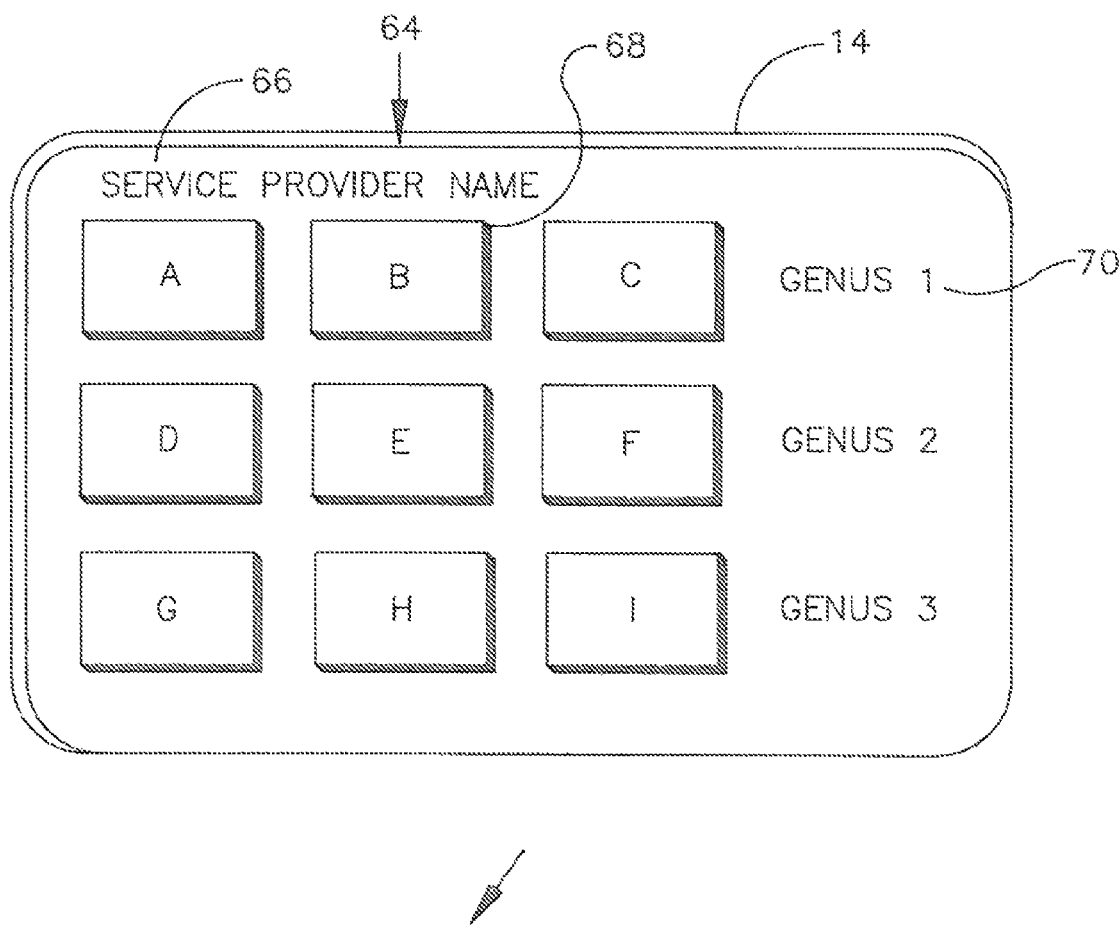
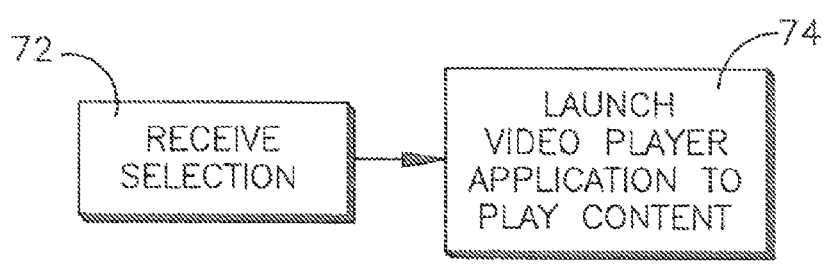

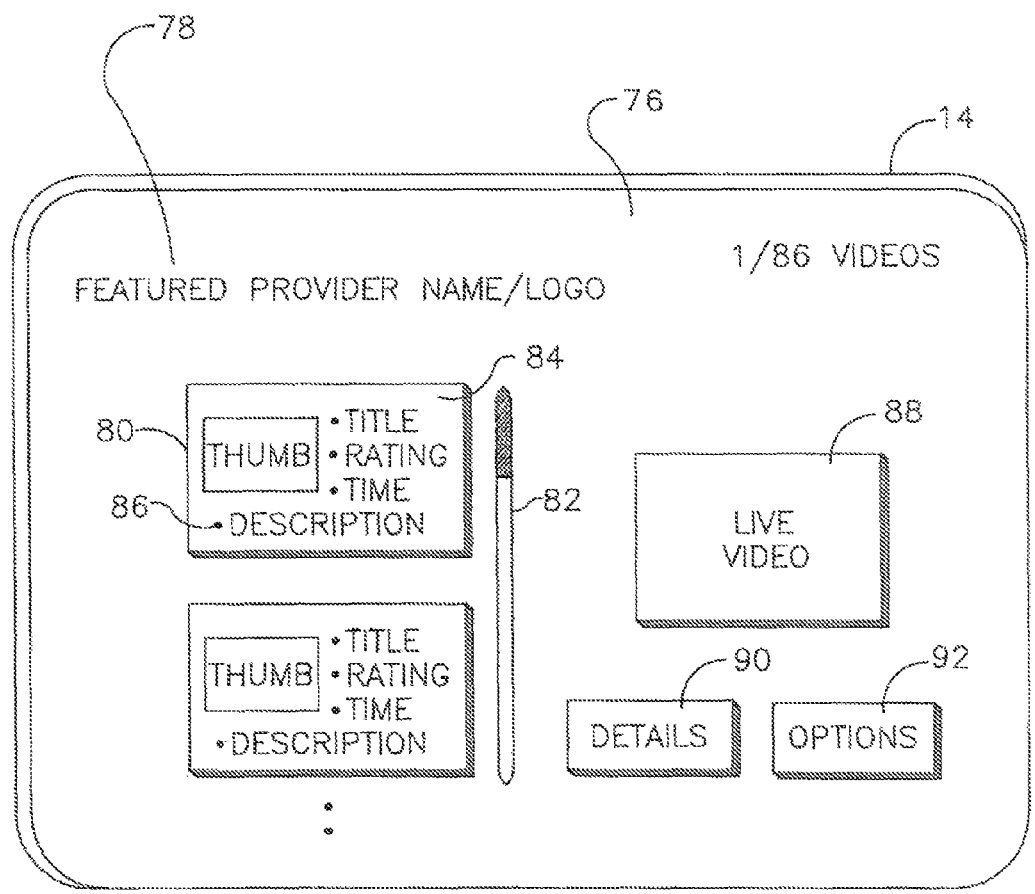

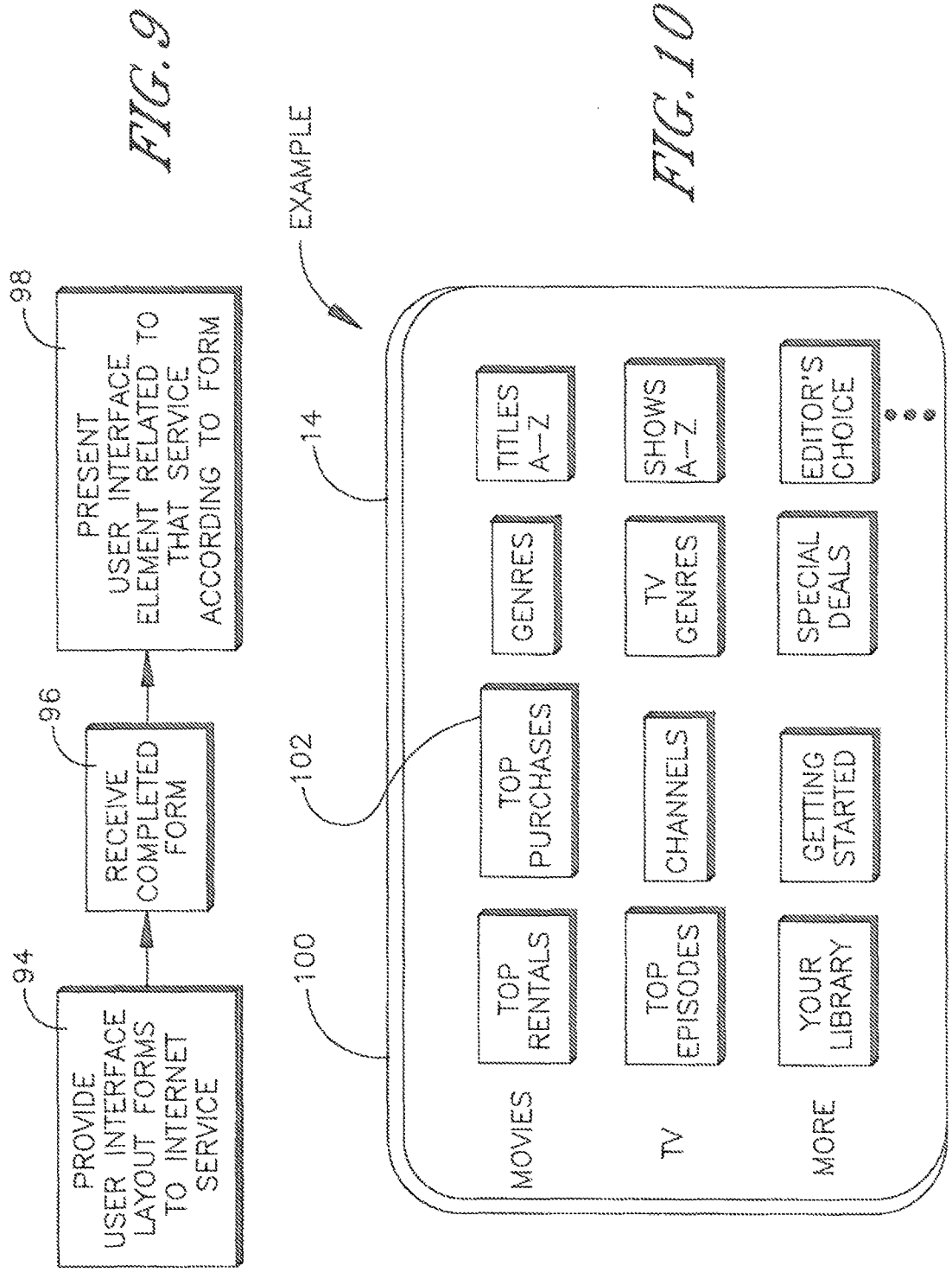

INTEGRATED USER INTERFACE FOR INTERNET-ENABLED TV

This application claims priority from U.S. provisional application 61/234,913, filed Aug. 18, 2009.

FIELD OF THE INVENTION

The present application is directed to integrated user interfaces (UI) for Internet-enabled TVs.

BACKGROUND OF THE INVENTION

Internet-enabled TVs have been provided in which a TV can present programming not just from its local TV tuner, a local video disk player, etc. but also from sources of content communicating with the TV over the Internet. As understood herein, to a viewer what is important is not so much the source of content but the type of content. Unfortunately, present UIs do not effectively present to a viewer/user a UI that consolidates and integrates content by type irrespective of source.

SUMMARY OF THE INVENTION

A TV has a chassis, a display supported on the chassis, a network interface, and a processor in the chassis communicating with a TV tuner and the network interface and controlling presentation on the display. A computer readable storage medium is local to the processor and is accessible to the processor. The processor executes logic to present a main user interface (UI) on the display. The main UI includes entries for respective content genre including video and TV. Responsive to an entry associated with the video genus being selected, the processor presents on the display at least one entry corresponding to an Internet video provider and at least one entry corresponding to at least one video file stored locally without being sourced through the network interface. A video from the Internet is sourced through the network interface for presentation on the display at least in part responsive to selection of the entry corresponding to the Internet video provider. On the other hand, a video from local storage is sourced for presentation on the display without passing through the network interface at least in part responsive to selection of the entry corresponding to at least one video file stored locally.

In example embodiments the entries for respective content genre on the main UI include entries for music and photographs. A sub-UI can be presented on the display in response to selection of an entry corresponding to an Internet video provider on the main UI. The sub-UI may include a grid of thumbnails, each row of which can represent a respective video genus. Selection of at least a first thumbnail causes a tertiary UI to be presented listing a subset of available videos in the video genus. In some implementations the layout of the thumbnails and respective hyperlinks is defined by the Internet video provider and not by a manufacturer of the TV.

Alternatively, the sub-UI can include a name and/or logo of the video provider and plural content cells. Each cell may include a respective thumbnail of an associated video represented by the cell along with at least a title of the video and a text description of the video. A live video window is also presented in this sub-UI in which is presented a video from the video provider whose name appears in the sub-UI to permit a viewer to watch a video in the window while browsing through the cells.

If desired, the TV may present at least one snippet of a widget overlaid on a video presentation on the display. The widget is downloaded through the network interface to present information on the display. The snippet can be moved by a viewer using a remote control (RC) in a first user-selected mode but cannot be moved by the viewer in a second user-selected mode.

In another aspect a method includes establishing a main user interface (UI) for a TV display. The main UI includes at least one entry selectable to invoke a sub-UI. The method includes receiving from an Internet content provider associated with the sub-UI layout information and hyperlink information related to the sub-UI. The main UI is presented on the TV display and in response to user selection of the entry, the sub-UI is presented on the display in accordance with the layout information received from the Internet content provider.

In another aspect, an assembly includes a TV tuner, a network interface, and a display receiving signals output by the TV tuner. A processor communicates with the TV tuner, network interface, and the display. A computer readable medium bears instructions executable by the processor to present on the display TV programming received from the tuner and to superimpose on the TV programming at least one snippet representing a widget received through the network interface. The snippet is a representation of the widget, which in turn is a portable module of computer software that is executed by the processor without requiring compilation. The snippet can be moved on the display in response to viewer commands input from a remote control (RC).

The details of the present invention, both as to its structure and operation, can best be understood in reference to the accompanying drawings, in which like reference numerals refer to like parts, and in which:

BRIEF DESCRIPTION OF THE DRAWINGS

FIG. 6 is a screen shot of a grid-like UI that may be invoked upon selection of an entry in the XMB;

FIG. 7 is a flow chart of logic that the processor may execute upon selection of an entry in the grid of FIG. 6;

FIG. 8 is a screen shot of an alternate UI that may be invoked upon selection of an antry in the XMB;

FIG. 9 is a flow chart showing logic for allowing forms to be used at the server side to define a UI for a particular IPTV provider;

FIG. 10 is a screen shot of an example UI that may be established by a server and downloaded for presentation on the TV;

DETAILED DESCRIPTION OF THE PREFERRED EMBODIMENT

Figure 1:
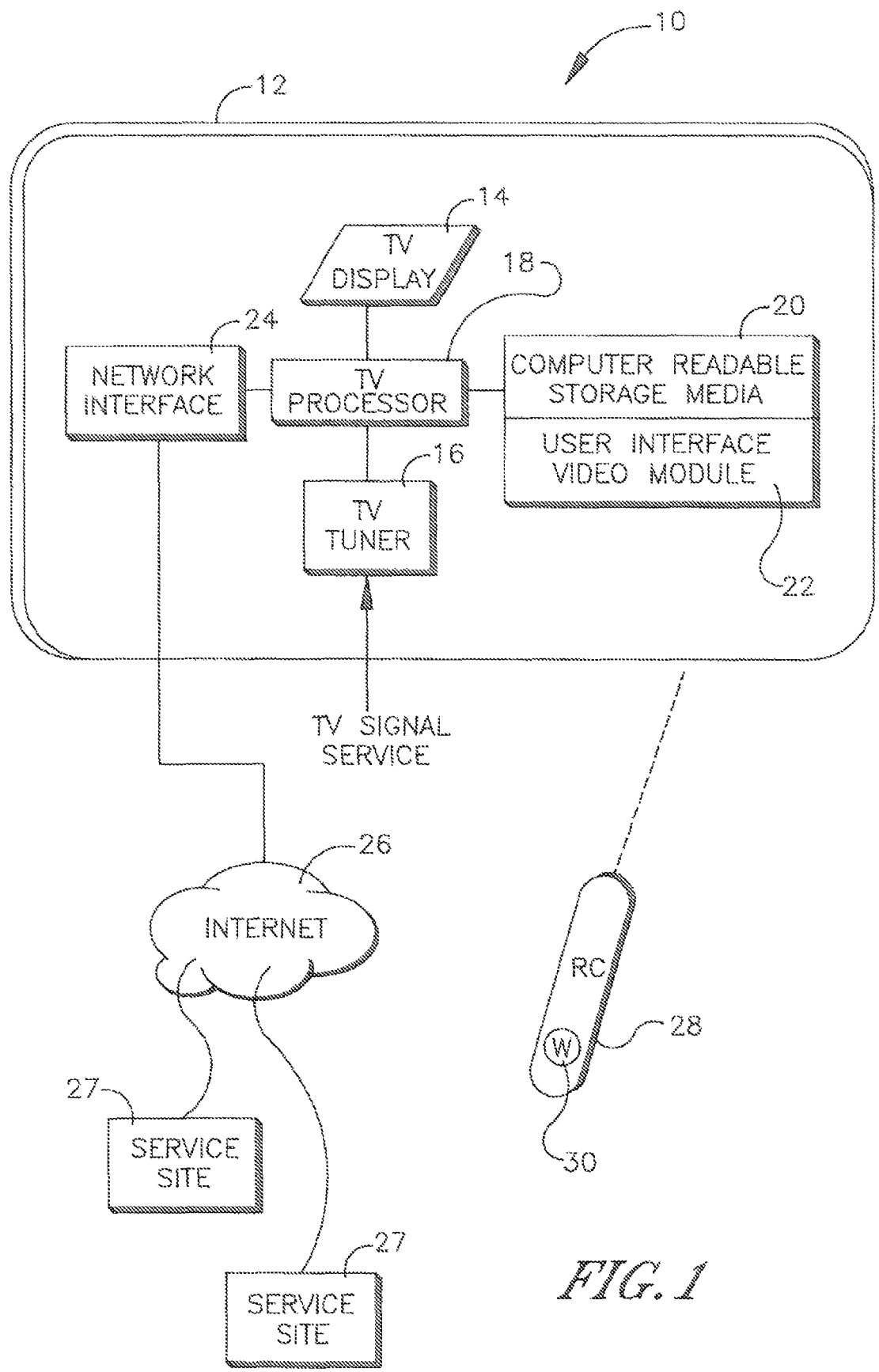
FIG. 1 is a block diagram of an example system in accordance with present principles.

Referring initially to FIG. 1, an assembly 10 is shown which includes a TV chassis 12 bearing a TV display 14 such as a standard definition and/or high definition matrix display. The display 14 presents video from a TV tuner 16 which may be in the chassis 12 as shown or which may be implemented in a separate set-top box. The TV tuner 16 receives TV signals from one or more TV sources including satellite receivers, cable head ends, and terrestrial broadcast transmitters.

A TV processor 18 communicates with the TV tuner 16 and with the display to control presentation on the display. The TV processor 18 accesses one or more computer readable storage media 20 such as but not limited to disk-based and/or solid state storage to execute instructions thereon. Among other instruction modules, the media 20 may bear a user interface (UI) module 22, a video player module, etc. that can be executed by the processor 18 to undertake present principles. The video module may be configured for streaming content from the Internet and may advantageously include seek functionality, a buffer emeter, zoom in and out capability, and "up next" and "options" features that dynamically update depending on the content and the needs of the server from which video is streamed.

The TV processor may also communicate with a network interface 24 within the chassis 12. The network interface 24 may be, without limitation, a wired or wireless modem or other appropriate interface to communicate with a wide area network such as the Internet 26, from which additional content such as Internet Protocol TV (IPTV) content, "widgets", etc. may be downloaded from Internet Protocol TV (IPTV) content site servers 27. A user can input user control signals to the processor for selection and cursor navigation using a remote control (RC) 28. The RC 28 may have a "widget" key 30 for purposes to be shortly disclosed.

Figure 2:
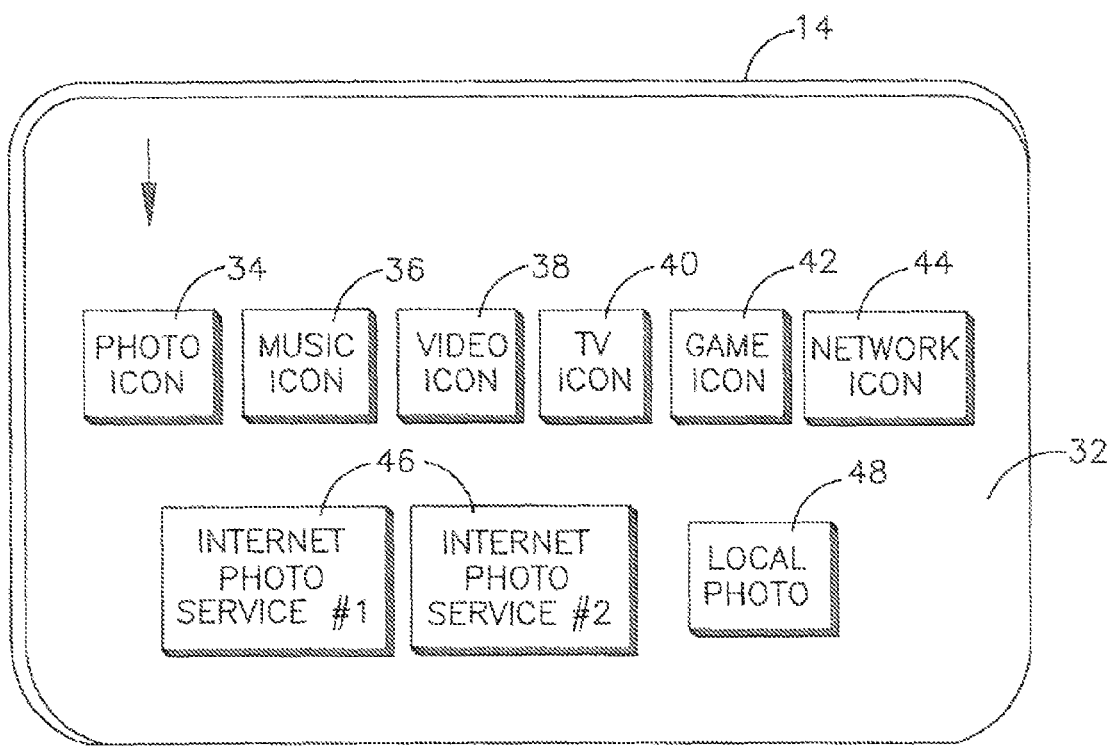
FIGS. 2-5 are screen shots showing an example UI in the form of a XMB with various categories selected.

Now referring to FIG. 2, an example UI, configured for illustration as a cross-media bar (XMB) 32, is shown. The icons represent content categories to organize the options available to the user. As set forth further below, when an icon is selected on the horizontal bar, several more icons appear vertically, above and below it, each representing an individual piece of content or perhaps a sub-directory or genre of content.

Accordingly, in the XMB 32 a row of icons is presented, with each icon representing a respective genus of content. In the example shown, from left to right the XMB 32 includes a photograph icon 34, a music icon 36, a video icon 38, a TV icon 40, a game icon 42, and a network icon 44. As set forth further below, by selecting the appropriate icon, further details of content that may selected for presentation on the TV are presented to the user.

FIG. 2 shows that when the photo icon 34 is in "focus", i.e., selected by means of clicking on it or hovering a screen cursor over it using the RC 28, plural sub-icons appear below (and/or above) the photo icon 34. In the example shown, photo service icons 46 icons appear below the photo icon 34, and one or more local photo icons 48 appear in the column as well.

A photo service icon 46 can be selected to cause a sub-UI to appear that can be used to select photos from the Internet photo service provider corresponding to the selected photo service icon. Such photos are subsequently downloaded to the TV through the network interface 24 for display on the display 14 by the processor 18 executing the video module on the media 20.

In contrast, selecting the local photo icon 48 can cause a sub-UI to appear that can be used to select for display photographs which are digitally stored locally. By "digitally stored locally" is meant that the photographs may be stored on the media 20 or on a nearby home entertainment system component such as a digital disk player, but in any case are not provided from a remote Internet source. Accordingly, it may now be appreciated that the UI shown in FIG. 2 is integrated with respect to photographs in that a single column under the photo genus icon 34 includes icons from which photos may be selected for viewing on the TV irrespective of whether the photo is sourced from the Internet or is sourced from local storage media 20. The placement of the photo service icons 46 the column relative to each other may be established according to contract with each service provider, with premium providers being placed higher in the column than other providers.

Figure 3:
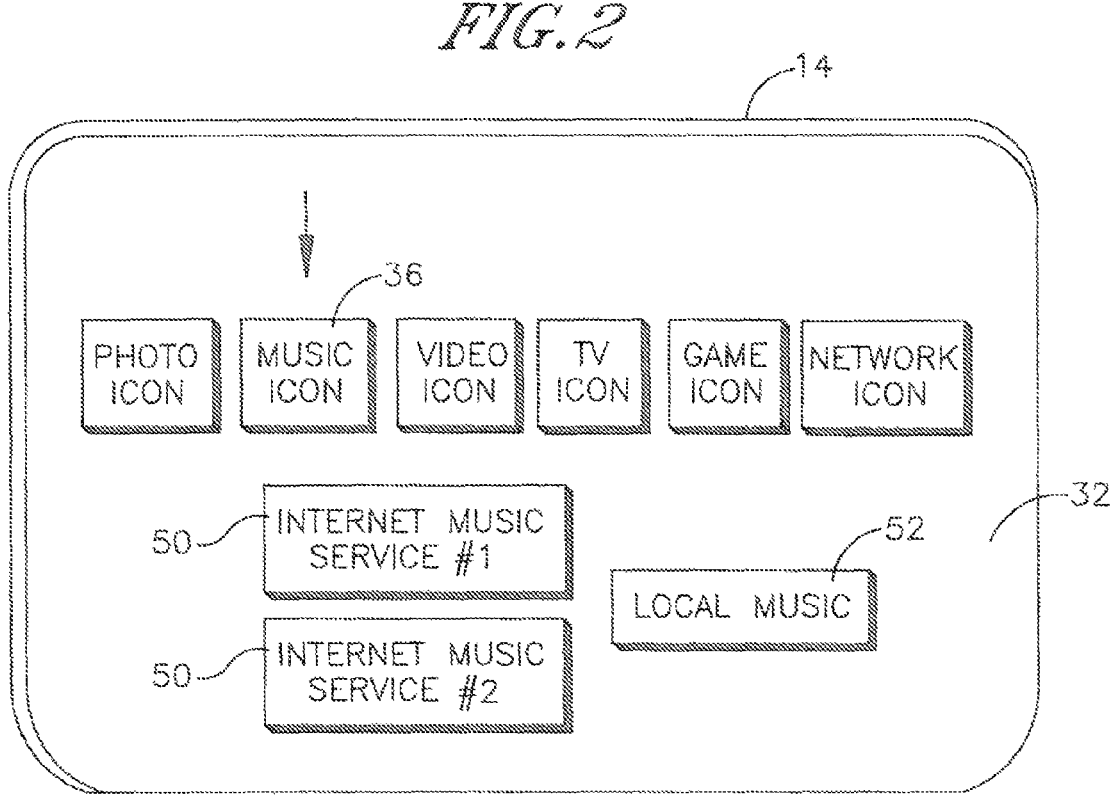

Similarly, FIG. 3 shows that when the music icon 36 is in "focus", plural sub-icons appear below (and/or above) it. In the example shown, music service icons 50 icons appear below the music icon 36, and one or more music icons 52 appear in the column as well.

A music service icon 50 can be selected to cause a sub-UI to appear that can be used to select music from the Internet music service provider corresponding to the selected music service icon. Such music is subsequently downloaded to the TV through the network interface 24 for display on the TV by the processor 18.

In contrast, selecting the local music icon 52 can cause a sub-UI to appear that can be used to select for display music which is digitally stored locally. Accordingly, it may now be appreciated that the UI shown in FIG. 3 is integrated with respect to music in that a single column under the music genus icon 36 includes icons from which music may be selected for viewing on the TV irrespective of whether the music is sourced from the Internet or is sourced from local storage media. The placement of the music service icons 50 the column relative to each other may be established according to contract with each service provider, with premium providers being placed higher in the column than other providers.

Figure 4:
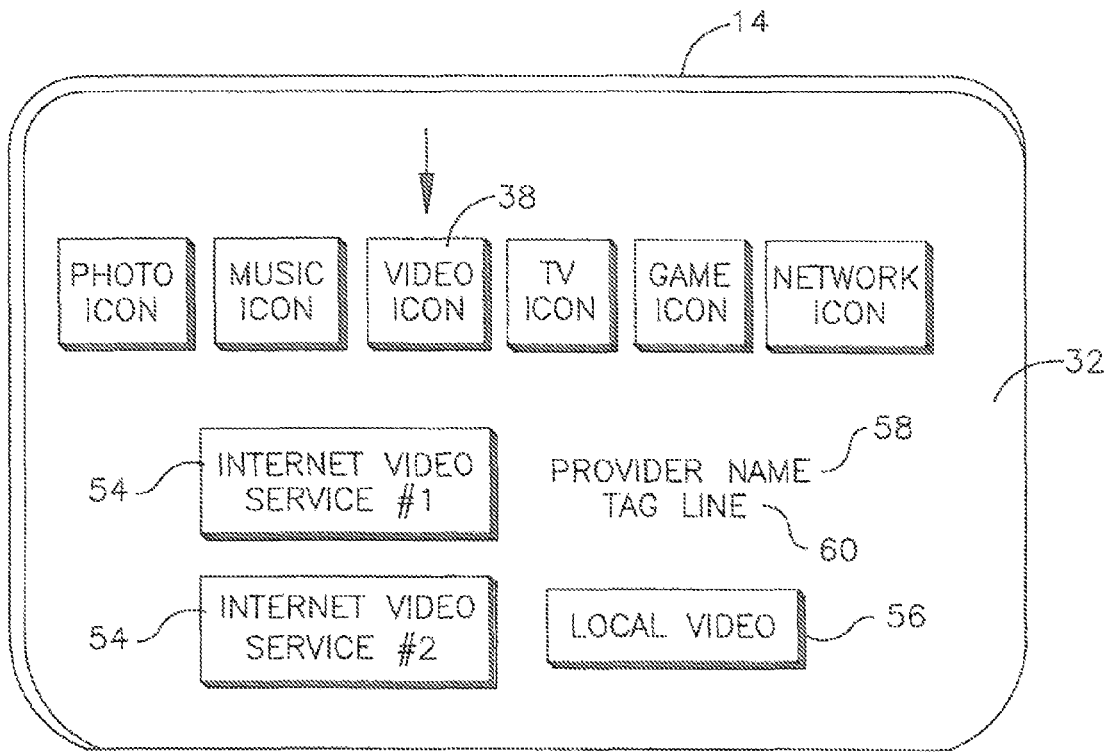

FIG. 4 shows that when the video icon 38 is in "focus", plural sub-icons appear below (and/or above) it. In the example shown, video service icons 54 icons appear below the video icon 38, and one or more video icons 56 appear in the column as well.

A video service icon 54 can be selected to cause a sub-UI to appear that can be used to select video from the Internet video service provider corresponding to the selected video service icon. Such video is subsequently downloaded to the TV through the network interface 24 for display on the TV by the processor 18.

In contrast, selecting the local video icon 56 can cause a sub-UI to appear that can be used to select for display video which is digitally stored locally. Accordingly, it may now be appreciated that the UI shown in FIG. 4 is integrated with respect to video in that a single column under the video genus icon 38 includes icons from which video may be selected for viewing on the TV irrespective of whether the video is sourced from the Internet or is sourced from local storage media. The placement of the video service icons 54 the column relative to each other may be established according to contract with each service provider, with premium providers being placed higher in the column than other providers.

As also shown in FIG. 4, if desired a provider name 58 and provider-defined tag line 60 may be presented on the UI next to the icon corresponding to that provider.

Figure 5:
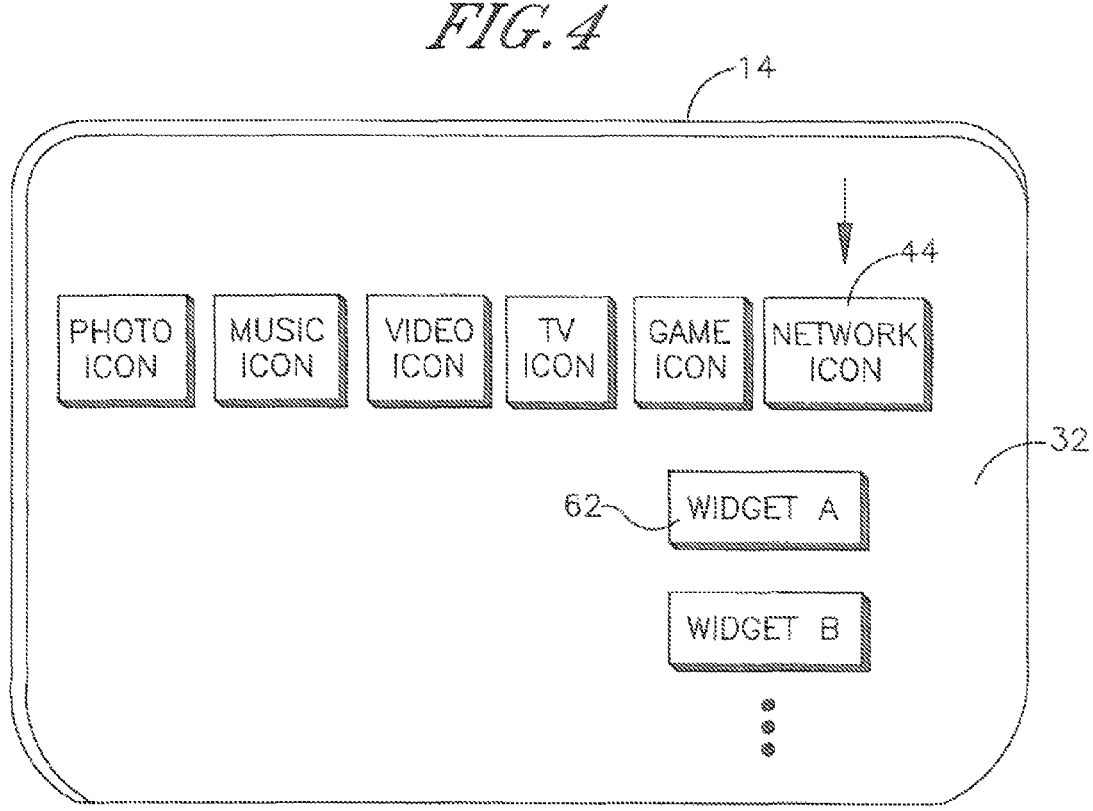

FIG. 5 shows that when the network icon 44 is in "focus", plural sub-icons appear below (and/or above) it. In the example shown, widget 62 appear below the network icon 44 and a widget icon can be selected to display the selected widget on the display as more fully disclosed below. By "widget" is meant a portable module of computer software that can be installed and executed within, for example, a HTML-based web page by an end user without requiring compilation. Widgets can take the form of on screen tools (such as, e.g., clocks, event countdowns, auction-tickers, stock market tickers, flight arrival information, daily weather etc). A widget may spawn one or more "snippets", which are minimized views of a widget. A widget can alternatively be launched by manipulating the widget key 30 on the RC 28.

FIG. 6 shows a UI 64 that may be presented on the display 14 in response to selecting one of the video service icons 54 in FIG. 4. The example UI shown may include the name 66 of the selected Internet video service provider and a grid of thumbnails 68 arranged in multiple rows as shown, with each row of the grid representing a respective genus having a label 70 such as, e.g., "movies", "baseball", and "news". Selecting a thumbnail 68 in the grid, which is received by the processor 18 at block 72 in FIG. 7, causes the processor 18 to launch the video player application at block 74 to play the content represented by the selected thumbnail. Thus, at block 74 the selected content is downloaded by the processor 18 executing the video player from the service provider Internet site 27 through the network interface 24 and presented on the TV, it being understood that the thumbnails 68 with underlying links are provided by the Internet video service provider associated with the selected grid. The video player may also be invoked to play music and to present photographs on the TV display 14. The above principles of sub-UIs apply equally to Internet music and photograph providers.

FIG. 8 shows an alternate UI 76 that can be presented on the display 14 when a video service icon 54 in FIG. 4 is selected. As shown, the name and/or logo 78 of the selected Internet video provider is presented on the UI 76, as are multiple content cells 80, in the example shown in FIG. 8 arranged in a column that can be scrolled through using a scroll bar 82. Each cell 80 can include a respective thumbnail 84 of the associated video represented by the cell along with (as shown generally at 86) the title, rating, and play period for the video. A text description 86 can also be provided in each cell.

In addition to the column of cells 80, the UI 76 shown in FIG. 8 can include a live video window 88 in which is presented a video from the service provider whose name appears at 78. The video may be from a video represented by a cell 80 that is in focus. In any case the viewer can watch a video in the window 88 while browsing through the cells 80. If desired, a "details" selector element 90 and an "options" selector element 92 may be presented in the UI 76 and selectable by a viewer manipulating the RC 28 to, e.g., respectively view details of a cell 80 or operation of the UI 76 and to undertake advanced functions such as enter a search term to search for a particular video represented by one of the cells 80.

As contemplated herein, sub-UIs associated with particular Internet content providers, such as the UIs shown in FIGS. 6 and 8, may be populated and organized "server side", i.e., by the Internet content providers themselves, as opposed to the TV manufacturer, who typically establishes the main UI 32 (FIGS. 2-5) from which the sub-UIs are invoked. Accordingly, at block 94 in FIG. 9 a UI layout form may be provided by the TV manufacturer to the Internet content providers and received back, completed, at block 96. At block 98 the sub-UI associated with an Internet content provider that has been invoked from the main UI 32 is presented on the TV display 14 according to the information in the returned form.

Another example of a sub-UI that may be defined by an associated Internet content provider is shown at 100 in FIG. 10. As shown, the UI 100 includes plural rows of thumbnails 102, with each row representing a respective genus. However, each thumbnail does not necessarily represent a specific piece of content, but instead can represent, as indicated by the thumbnail names in FIG. 10, other menus and/or content lists which in turn are presented when the associated thumbnail 102 is selected. As was the case with the sub-UIs above, the content and layout including links to other menus/content lists is defined not by the TV manufacturer but by the associated Internet content provider.

Figure 11:
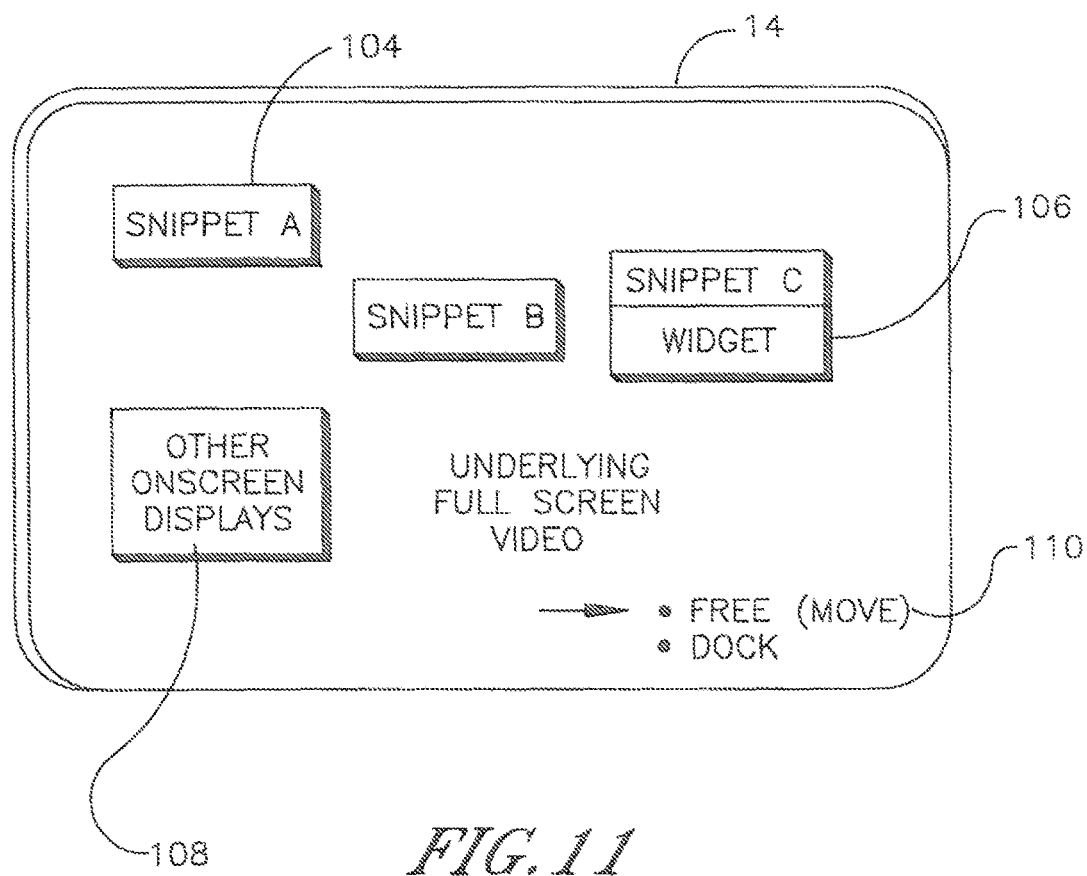
FIGS. 11 and 12 are screen shots illustrating features of displaying snippets of widhets.

Now referring to FIG. 11, the TV screen 14 may present a full screen video and overlaid onto the full screen video one or more snippets 104. When a snippet is in focus by, e.g., hovering a screen cursor over it, as shown at 106 the underlying widget is shown. In this way, for instance, current weather as provided by a weather widget through the network interface 24 may be overlaid on the presentation of an underlying TV show.

FIG. 11 illustrates a free space mode in which the snippets 104 may appear anywhere on the display 14 and can be moved on the display by a viewer manipulating the RC 28. The position at which the snippet 104 is dropped by the viewer persists. Simultaneously with overlaying the snippets 104 on the video, other on screen displays (OSD) 108 such as closed captioning, banners, etc. may be overlaid on the video. In any case, the free space mode may be invoked by selecting a free space selector element 110 using, e.g., the RC 28.

In contrast, a dock selector element 112 may be selected using the RC 28 to cause all the snippets 104 to be arrayed in a single row at, e.g., the bottom of the display. In this way, the snippets are less obtrusively presented. The snippets 104 cannot be moved by the viewer in the dock mode. To move the snippets 104 the viewer must again select the free space mode.

Figure 12:
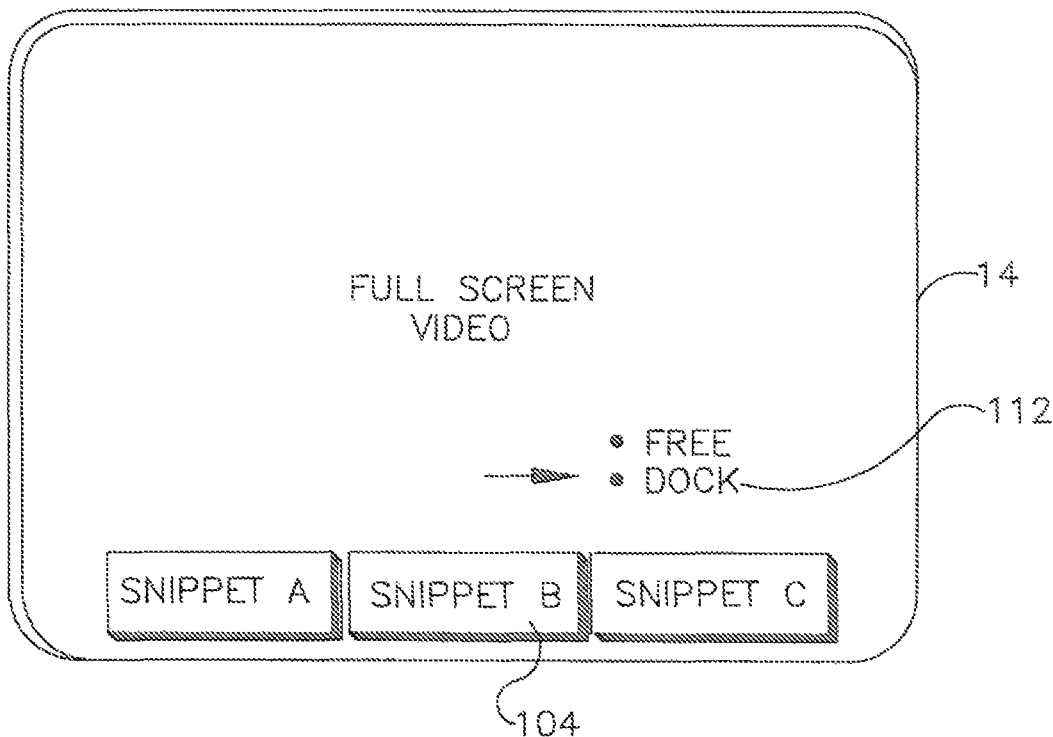
Figure 13:
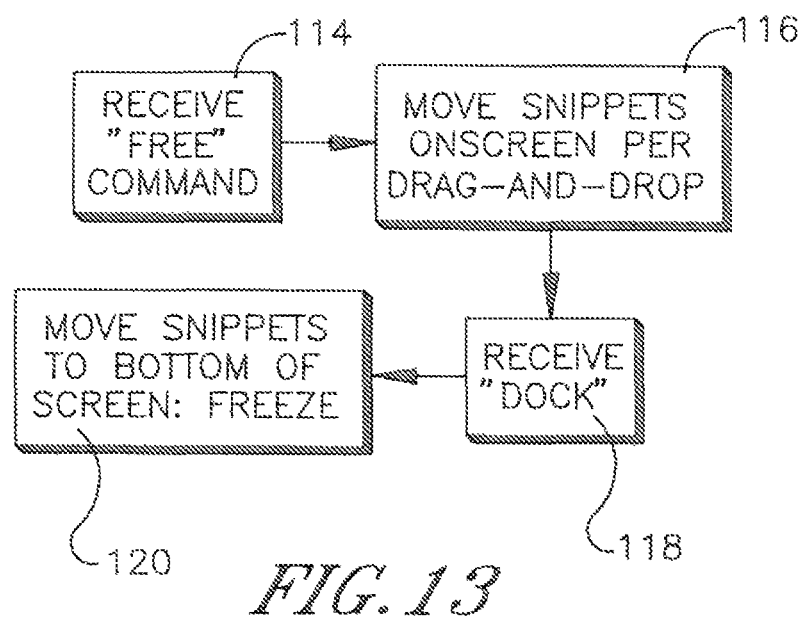
FIG. 13 is a flow chart showing logic for presenting the screen shots of FIGS. 11 and 12.

FIG. 13 illustrates. At block 114 the viewer selects the free space mode and moves snippets as desired at block 116 using the RC 28 to drag and drop them. The user can input the dock selection at block 118 which causes the processor 18 to move the snippets into the configuration shown in FIG. 12 at block 120 and freeze them into the dock position.

While the particular INTEGRATED USER INTERFACE FOR INTERNET-ENABLED TV is herein shown and described in detail, it is to be understood that the subject matter which is encompassed by the present invention is limited only by the claims. For example, recommendations which extend into the future can be provided when, for instance, the television is equipped with recording capability (such as a DVR), or reminders for future broadcast content.

What is claimed is:

1. Device comprising:
   processor communicating with a network interface and controlling presentation on a video display;
   computer readable storage medium local to the processor and accessible to the processor, the computer readable storage medium including instructions executable by the processor to configure the processor to:
   present a main user interface (UI) on the display, the main UI having a layout established by a manufacturer of the device and including entries for respective content genre including video and TV, wherein responsive to an entry associated with the video genus being selected, the instructions when executed by the processor configure the processor to present on the display a sub-UI including at least one entry corresponding to an Internet video provider and at least one entry corresponding to at least one video file stored locally without being sourced through the network interface, a video from the Internet being sourced through the network interface for presentation on the display at least in part responsive to selection of the entry corresponding to the Internet video provider, a video from local storage being sourced for presentation on the display without passing through the network interface at least in part responsive to selection of the entry corresponding to at least one video file stored locally, wherein layout information of elements in the sub-UI and hyperlinks related to the sub-UI are received by the device from the Internet video provider, such that the Internet video provider, as opposed to the manufacturer of device who establishes the main from which the sub-UI is invoked, completes a layout design of the sub-UI which the Internet video provider provides to the manufacturer of the device to facilitate invoking the sub-UI associated with the Internet video provider when the sub-UI is selected from the main UI according to the layout design of the sub-UI established by the Internet video provider; wherein at least a first thumbnail on the sub-UT representing another menu and/or a content list which in turn is presented when the first thumbnail is selected, the menu and/or content list being associated with a hyperlink to content defined not by the manufacturer of the device but by the Internet video provider, wherein the instructions when executed by the processor configure the processor to present at least one snippet of a widget overlaid on a video presentation on the display, the widget being downloaded through the network interface to present information on the display, the snippet being movable by a viewer using a remote control (RC) in a first user-selected mode and not being movable by the viewer in a second user-selected mode.

2. The device of claim 1, wherein the entries for respective content genre on the main UI include entries for music and photographs.

3. The device of claim 1, wherein a sub-UI is caused to be presented on the display in response to selection of an entry corresponding to an Internet video provider on the main UI, wherein the sub-UI includes a grid of thumbnails and wherein each row of the grid represents a respective video genus and selection of at least a first thumbnail causes a tertiary UI to be presented listing a subset of available videos in the video genus.

4. The device of claim 3, wherein the layout of the thumbnails and respective hyperlinks is defined by the Internet video provider and not by a manufacturer of the device.

5. The device of claim 3, wherein the sub-UI includes:
a name and/or logo of the video provider;
plural content cells, each cell including a respective thumbnail of an associated video represented by the cell along with at least a title of the video and a text description of the video; and
a live video window in which is presented a video from the video provider whose name appears in the sub-UI to permit a viewer to watch a video in the window while browsing through the cells.

6. Assembly comprising:
processor communicating with a network interface, and a display; and
computer readable medium bearing instructions executable by the processor to present on the display TV programming and to superimpose on the TV programming at least one snippet representing a widget received through the network interface, the snippet being a representation of the widget, the widget being a portable module of computer software that is executed by the processor without requiring compilation, the snippet being movable on the display from a first location on the display to second location on the display that is different and distanced from the first location in response to viewer commands input from a remote control (RC), wherein the snippet is movable in response to commands from the RC in a first user-selected mode and is not movable in response to commands from the RC in a second user-selected mode.

7. The assembly of claim 6, wherein the processor presents a main user interface (UI) on the display, the main UI including entries for respective content genre including video and TV, wherein responsive to an entry associated with the video genus being selected, the processor presents on the display at least one entry corresponding to an Internet video provider and at least one entry corresponding to at least one video file stored locally without being sourced through the network interface, a video from the Internet being sourced through the network interface for presentation on the display at least in part responsive to selection of the entry corresponding to the Internet video provider, a video from local storage being sourced for presentation on the display without passing through the network interface at least in part responsive to selection of the entry corresponding to at least one video file stored locally.

8. The assembly of claim 7, wherein the processor receives through the network interface sub-UI layout information and hyperlink information related to the sub-UI and responsive to a selection on the main UI displays the sub-UI in accordance with the layout information.

9. The assembly of claim 8, wherein the sub-UI includes a grid of thumbnail.

* * * * *